(12) United States Patent
Goldberg et al.

(10) Patent No.: US 9,459,800 B2
(45) Date of Patent: Oct. 4, 2016

(54) STORAGE REGION METADATA MANAGEMENT

(71) Applicant: INTERNATIONAL BUSINESS MACHINES CORPORATION, Armonk, NY (US)

(72) Inventors: Itzhack Goldberg, Hadera (IL); Barak Pinhas, Givatayim (IL); Amichai Schreiber, Modin (IL); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 14/325,949

(22) Filed: Jul. 8, 2014

(65) Prior Publication Data
US 2016/0011801 A1    Jan. 14, 2016

(51) Int. Cl.
*G06F 12/00* (2006.01)
*G06F 3/06* (2006.01)
*G06F 12/12* (2016.01)

(52) U.S. Cl.
CPC .......... *G06F 3/0619* (2013.01); *G06F 3/0655* (2013.01); *G06F 3/0665* (2013.01); *G06F 3/0688* (2013.01); *G06F 3/0689* (2013.01); *G06F 12/122* (2013.01); *G06F 2212/69* (2013.01)

(58) Field of Classification Search
CPC ............... G06F 12/00; G06F 12/0238; G06F 12/0246; G06F 3/0697

USPC .......................................... 711/100, 103, 154
See application file for complete search history.

(56) References Cited

U.S. PATENT DOCUMENTS

| | | | |
|---|---|---|---|
| 7,143,124 B2 | 11/2006 | Garthwaite | |
| 7,707,287 B2 * | 4/2010 | Shafir | H04L 63/02 709/217 |
| 8,429,371 B2 | 4/2013 | Meiners | |
| 8,510,499 B1 * | 8/2013 | Banerjee | G06F 12/0246 711/103 |
| 8,762,431 B2 * | 6/2014 | Wang | G06F 17/30117 707/821 |
| 2007/0266203 A1 * | 11/2007 | Amano | G06F 11/1456 711/111 |

* cited by examiner

*Primary Examiner* — Tuan Thai
(74) *Attorney, Agent, or Firm* — Griffiths & Seaton PLLC

(57) ABSTRACT

Methods, computing systems and computer program products implement embodiments of the present invention that include configuring a mapping table to store mappings between logical and physical storage regions on one or more storage devices, and configuring recent and stable lists to store physical region numbers for non-mapped physical storage regions. A request is received to delete, from the mapping table, a given mapping including a given physical storage region, and the metadata indicating the given physical storage region is stored to a recent list stored in the memory. When the mapping table is destaged from the memory to a given storage device, the metadata is moved from the recent list to a stable list stored in the memory. Upon receiving a mapping request, a physical storage region is allocated from the stable list. If the recent list is empty, then the physical storage region is allocated from the recent list.

20 Claims, 5 Drawing Sheets

STORAGE REGION METADATA MANAGEMENT

FIELD OF THE INVENTION

The present invention relates generally to data storage, and specifically to providing a method for extending the relevancy of a periodically destaged mapping table metadata, in order to improve mapping table recoverability in the event of a system crash.

BACKGROUND

In computer storage systems (also referred to herein as storage subsystems), disk partitioning and logical volume management are used to manage physical storage devices such as hard disk drives. In disk partitioning, a single storage device can be divided into multiple logical storage units referred to as partitions or regions, thereby enabling the single physical storage device to appear as one or more logical volumes. Logical volume management provides a method of allocating space on mass-storage devices that is more flexible than conventional partitioning schemes. In particular, a volume manager can concatenate, stripe together or otherwise combine regions (a region, also referred to herein as a partition, is a sequence of bytes having a specific length, typically one megabyte) into larger virtual regions that administrators can re-size or move, potentially without interrupting system use.

To manage a given volume, a mapping table (also known as a partition table) can be utilized to define the relationship between a logical address of a logical volume and physical regions (also known as blocks and partitions) on the physical storage device. Upon receiving a request to perform an input/output (I/O) operation at a specific logical address in the given volume, a storage system can utilize the mapping table identify the physical location on a storage device that corresponds to the specific logical address.

The description above is presented as a general overview of related art in this field and should not be construed as an admission that any of the information it contains constitutes prior art against the present patent application.

SUMMARY

There is provided, in accordance with an embodiment of the present invention a method, including configuring, in a memory, a mapping table to store mappings between logical and physical storage regions on one or more storage devices, receiving, by a processor, a request to delete, from the mapping table, a given mapping including a given physical storage region storing metadata indicating the given physical storage region to a recent list stored in the memory, and upon detecting that the mapping table was destaged from the memory to a given storage device, moving the metadata from the recent list to a stable list stored in the memory.

There is also provided, in accordance with an embodiment of the present invention an apparatus, including a storage device comprising multiple physical storage regions, a memory configured to store a mapping table, a recent list, and a stable list, and a processor arranged to configure the mapping table to store mappings between logical storage regions and the physical storage regions, to receive a request to delete, from the mapping table, a given mapping including a given physical storage region, to store metadata indicating the given physical storage region to the recent list, and upon detecting that the mapping table was destaged from the memory to the storage device, to move the metadata from the recent list to the stable list.

There is further provided, in accordance with an embodiment of the present invention a computer program product, the computer program product including a non-transitory computer readable storage medium having computer readable program code embodied therewith, the computer readable program code including computer readable program code arranged to configure, in a memory, a mapping table to store mappings between logical and physical storage regions on one or more storage devices, computer readable program code configured to receive a request to delete, from the mapping table A given mapping including a given physical storage region, computer readable program code configured to store metadata indicating the given physical storage region to a recent list stored in the memory, and computer readable program code configured, upon detecting that the mapping table was destaged from the memory to a given storage device, to move the metadata from the recent list to a stable list stored in the memory.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
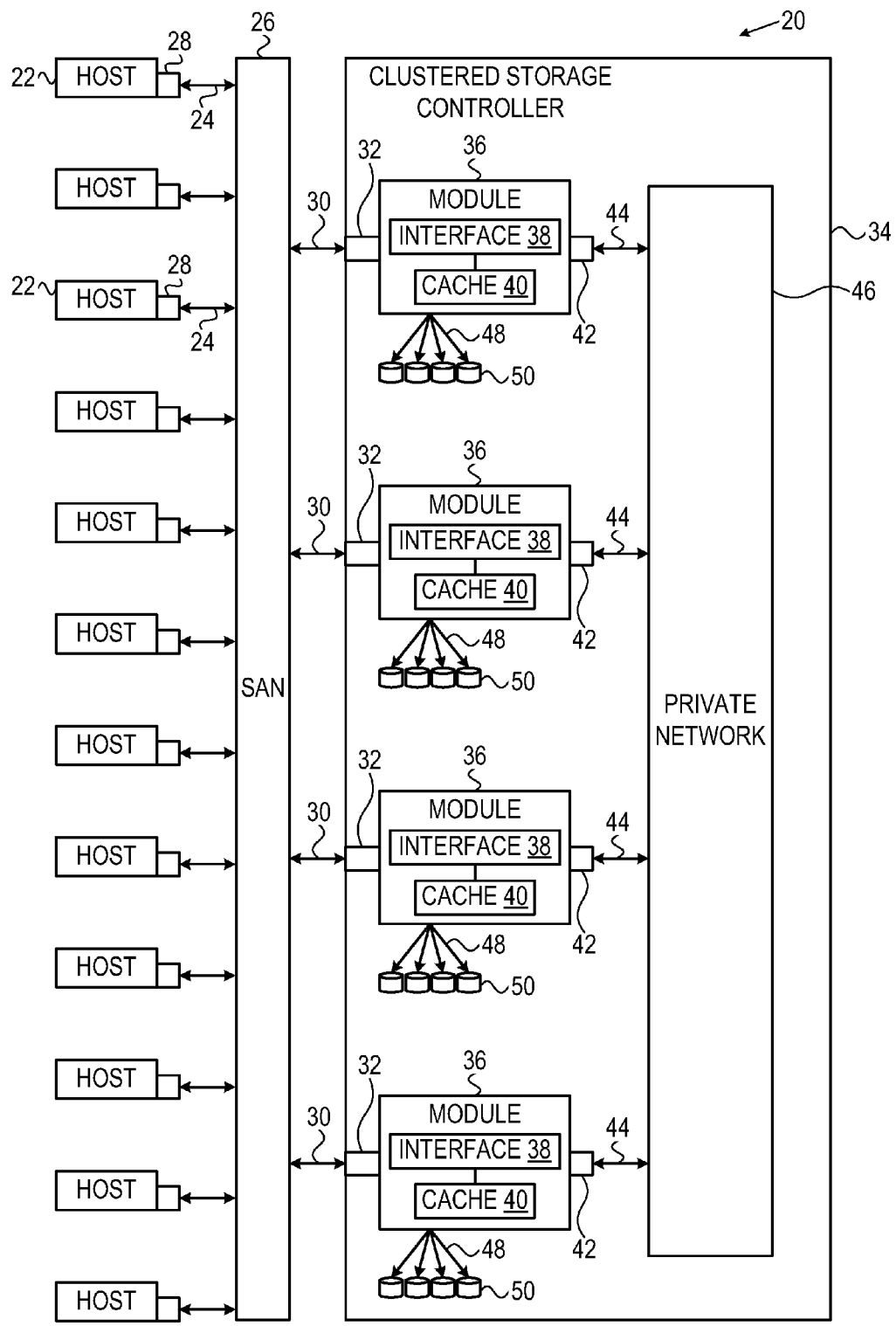
FIG. 1 is a block diagram that schematically illustrates a storage system comprising a storage controller, in accordance with an embodiment of the present invention.

In storage systems comprising one or more non-volatile storage devices having multiple physical storage regions, each of the storage regions can have a corresponding physical address, and the storage system can use a mapping table to store metadata indicating mappings of logical addresses to physical addresses on the storage devices. When a logical storage region having a logical address (also referred to herein as a logical region number) is associated with a physical storage region having a physical address (also referred to herein as a physical region number), the logical storage region can be considered to be mapped to the physical storage region, and the logical address can be considered to be mapped to the physical address.

In operation, the mapping table is typically stored in a volatile memory and is periodically destaged to a non-volatile storage device. In embodiments herein, the mapping table in the volatile memory may be also be referred to as a non-persisted mapping table, and the mapping table stored on the non-volatile storage device may also be referred to as a persisted mapping table. In the event of a system crash, there may be inconsistencies between the mappings in the non-persisted mapping table and the mappings in the persisted mapping table.

For example, a persisted mapping table initially stores a mapping of physical storage region P1 to a logical storage region L1. Subsequently, in the non-persisted mapping table, L1 is subsequently deleted (for any reason), and P1 is remapped to logical storage region L2. If the storage system crashes prior to mappings in the updated non-persisted mapping table being destaged to the persisted mapping table, mappings stored in the persisted partition are the only mappings available when the storage system recovers from the crash. Therefore, if destaging of L2 data had already commenced prior to the crash, L2 can suffer a sizable data loss, and L1 may appear to be very corrupted. In other words, the data stored on P1 may differ significantly from the data stored on L1.

Embodiments of the present invention provide methods and systems for minimizing chances for data inconsistency and integrity subsequent to a system crash. In some embodiments, a non-persisted mapping table can be configured to store mappings between logical and physical storage regions on one or more storage devices. Upon receiving a request to delete, from the mapping table, a given mapping comprising a given physical storage region, metadata indicating the given physical storage region can be stored to a recent list stored in the volatile memory, and upon detecting that the mapping table was destaged from the volatile memory to a given storage device, the metadata can be moved to a stable list also stored in the volatile memory.

As described hereinbelow, non-mapped physical storage regions in the storage system can be divided among the stable list and the recent list, newly-freed physical storage regions can be added to the recent list, and when a physical storage region allocation is requested for a mapping, the storage system can attempt to first allocate a physical storage region from the stable list. If there are no physical storage regions available in the stable list, the system can stop attempting to allocate physical storage regions from the stable list, and start allocating physical storage regions from the recent list. Additionally, when the non-persistent mapping table's metadata is destaged to the persistent mapping table, the recent list can be flushed into the stable list.

As long as enough space is available between mapping table metadata destages, systems implementing embodiments of the present invention can help ensure that physical storage regions are not reused between the metadata destages. This allows recovery procedures to assume that the destaged mapping table metadata is correct.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
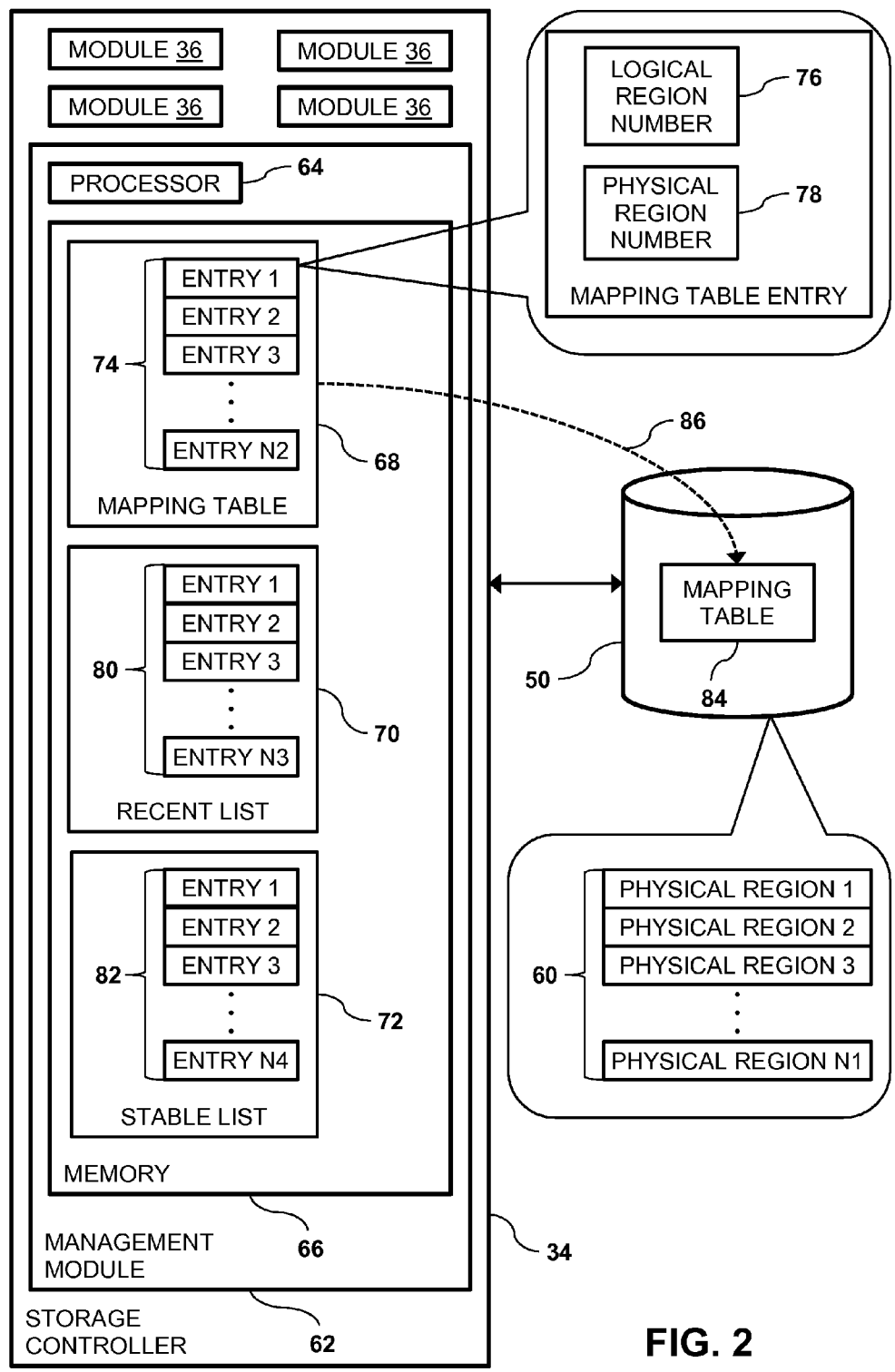
FIG. 2 is a block diagram that schematically illustrates a given storage controller configured to manage physical storage region metadata, in accordance with an embodiment of the present invention.

FIG. 2 is a block diagram that schematically illustrates a given storage controller 34 configured to manage physical storage region metadata, in accordance with an embodiment of the present invention. In the configuration shown in FIG. 2, storage device 50 comprises multiple physical storage regions 60. While embodiments herein describe managing physical storage region metadata for storage controller 34, configuring any type of computer configured to manage physical storage region metadata for a storage device is considered to be within the spirit and scope of the present invention.

In addition to modules 36, storage controller 34 comprises a management module 62 that manages modules 36. Management module 62 comprises a processor 64 and a volatile memory 66. Although not explicitly shown in FIG. 2 for purposes of illustrative simplicity, management module 62 can communicate with modules 36 via private network 46.

Memory 66 stores a first mapping table 68, a recent list 70 and a stable list 72. Mapping table 68 comprises multiple mapping table entries 74, and each of the entries comprises a logical region number 76 and a respective physical region number 78 that references a given physical storage region 60 on storage device 50. In embodiments described herein, when a given entry comprises a given logical region number 76 and a given physical region number 78, a given logical storage region having the given logical region number is considered to be mapped to the given physical storage region 60 having the given physical region number 78. In some embodiments, logical region number 76 may comprise a logical address for a given logical storage region, and physical region number 78 may comprise a physical address for a given physical storage region.

Recent list 70 and stable list 72 comprise "free lists" that store physical region numbers for any physical storage regions 60 that are not currently mapped to any logical storage region in mapping table 68. Recent list 70 comprises multiple recent list entries 80, and stable list 72 comprises multiple stable list entries 82. Each given recent list entry and each given stable list entry comprise a given physical region number of a given physical storage region 60. Therefore, in embodiments herein a given entry 80 may also be referred to as a given physical region number 80 and a given entry 82 may also be referred to as a given physical region number 82. Recent list 70 and stable list 72 are described in more detail hereinbelow.

In operation, processor 64 periodically destages mapping table 68 from memory 66 to a second mapping table 84 stored on storage device 50, as indicated by an arrow 86. In embodiments herein, mapping table 68 stored in memory 66 may also be referred to as non-persisted mapping table 68, and mapping table stored on storage device 50 may also be referred to as persisted mapping table 84. Additionally, physical region numbers 80, 82 and 78 may also be referred to herein as metadata for a given physical storage region 60.

As described hereinbelow, upon processor 64 deleting a given physical region number 78 from a given entry 74 in mapping table 68 (i.e., the processor unmaps the physical storage region associated with the given physical region number from a respective logical region number 76), the processor adds the given physical region number to recent list 70. Upon processor destaging the non-persisted mapping table to the persisted mapping table, the processor moves the given physical region number from recent list 70 to stable list 72. Therefore, stable list 72 stores the physical region numbers of any physical storage regions 60 that have either (a) not yet been mapped to a given logical storage region, or (b) whose mapping was deleted from both non-persisted mapping table 68 and persisted mapping table 84 (i.e., subsequent to updating the non-persisted mapping table by deleting a given mapping, and destaging the updated non-persisted mapping table to the non-persisted mapping table).

Processor 64 may comprise a general-purpose central processing unit (CPU) or a special-purpose embedded processor, which is programmed in software or firmware to carry out the functions described herein. The software may be downloaded to module 62 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Storage System Metadata Management

Figure 3:
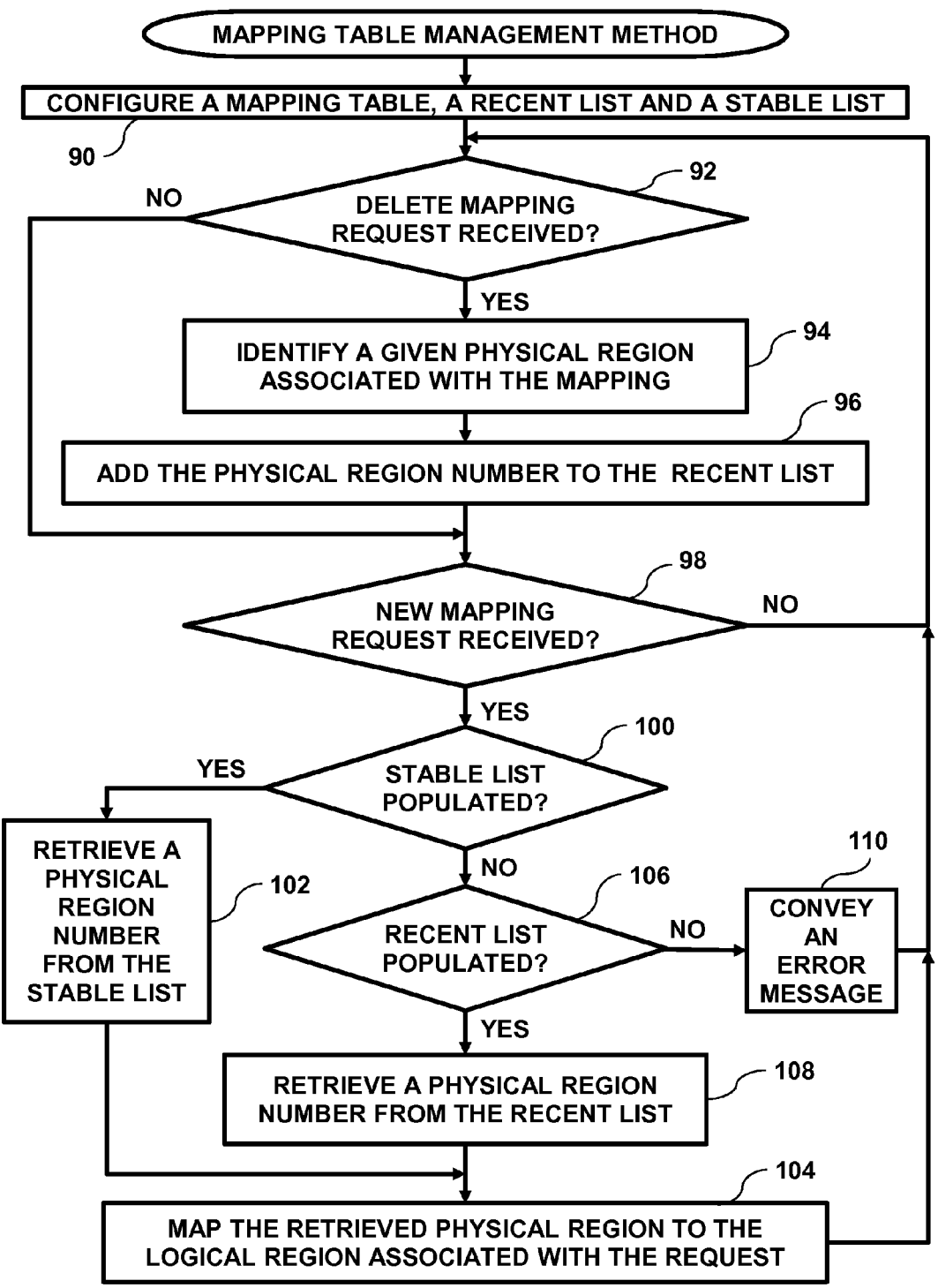
FIG. 3 is a flow diagram that schematically illustrates a method of managing a mapping table, in accordance with an embodiment of the present invention.

FIG. 3 is a flow diagram that schematically illustrates a method of managing metadata for mapping table 68, in accordance with an embodiment of the present invention. In an initialization step 90, processor 64 configures and initializes, in memory 66, mapping table 68, recent list 70 and stable list 72.

As described supra, in embodiments herein, a given mapping comprises a given physical region number of a given physical storage region 60 that is currently mapped to (i.e., associated with) a given logical region number. In a first comparison step 92, if processor 64 receives a request to delete a given mapping for a given logical region number 76 from mapping table 68, then the processor identifies, in the non-persistent mapping table, a respective physical region number 78 for the given logical region number in an identification step 94, and adds the identified physical region number to recent list 70 in an adding step 96.

In a second comparison step 98, if processor 64 receives a new mapping request for a given logical region number 76, then in a third comparison step 100, the processor checks if stable list 72 is populated (i.e., stores any physical region numbers 82). If stable list 72 is populated, then in a first retrieval step 102, processor 64 retrieves a given physical region number from the stable list. In a mapping step 104, processor 64 maps the retrieved physical region number to the given logical region number that was received with the new mapping request, and the method continues with step 92.

Returning to step 100, if stable list 72 is not populated, then in a fourth comparison step 106, processor 64 checks if recent list 70 is populated with any physical region number 80. In other words, when allocating physical storage regions 60 to mapping table 68, processor 64 will exhaust all physical region numbers 82 before attempting to allocate any physical region numbers 80.

If recent list 70 is populated, then in a second retrieval step 108, processor 64 retrieves a given physical region number 80 from the recent list and the method continues with step 104. When continuing with step 104 in this case, processor 64 maps the given logical storage region to a given physical storage region 60 associated with the given physical region number retrieved in step 108.

Returning to step 106, if recent list 72 is not populated with any physical region numbers 82, then storage device 50 is fully utilized, and processor 64 conveys an error message indicating that it perform the mapping in an error step 110, and the method continues with step 92. Returning to step 98, if processor 64 did not receive a new mapping request, then the method continues with step 92. Returning to step 92, if processor 64 did not receive a request to delete a mapping in mapping table 68, then the method continues with step 98.

Figure 4:
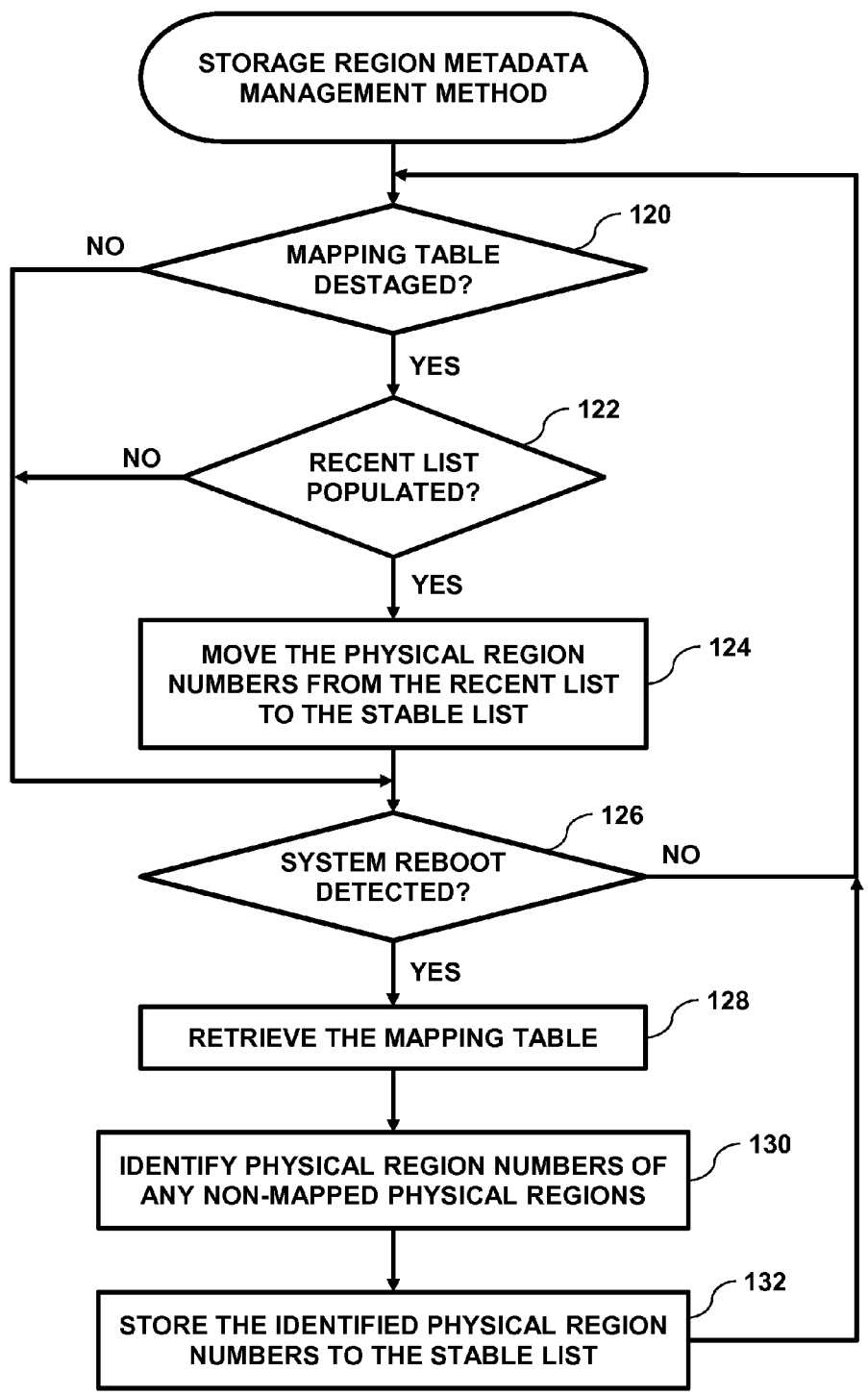
FIG. 4 is a flow diagram that schematically illustrates a method of managing the physical storage region metadata for the mapping table, in accordance with an embodiment of the present invention.

FIG. 4 is a flow diagram that schematically illustrates a method of managing metadata used by mapping table 68, in accordance with an embodiment of the present invention. In a first comparison step, if processor 64 detects that mapping table 68 has been destaged to mapping table 84, then in a second comparison step 122, the processor checks if recent list 70 is populated with any physical region numbers 80. If recent list is populated, then in a move step 124, processor 64 moves (all) the physical region numbers stored in recent list 70 to stable list 72.

In operation, storage device 50 can maintain an additional data structure containing addresses of free space, and can use this data structure for allocating physical storage regions 60. In embodiments where storage device 50 comprises a hard disk drive, this data structure typically assigns a higher allocation priority to physical storage regions 60 located at lower addresses, in order to enhance performance. Since physical storage regions 60 on a hard disk that have lower addresses are typically faster than the physical storage regions with higher addresses, the data structure can be configured to leave the higher address physical storage regions unused (i.e., if the hard disk is not fully utilized) in order to enhance performance.

In embodiments where storage device 50 comprises a hard disk, the data structure can be configured to avoid the performance cost of sorting the available physical storage regions by always returning recently-freed regions 60. To always return recently-freed regions 60, processor 64 can configure recent list 70 and stable list 72 (i.e., the "data structure") as respective last-in-first-out (LIFO) queues in memory 66. Upon processor 64 detecting that mapping table 68 is destaged to mapping table 84, the processor can prepend the recent list LIFO queue to the stable list LIFO queue, thereby ensuring that new allocations/mappings will take physical storage regions 60 that were referenced in the recent list LIFO queue prior to the destage.

Returning to the flow diagram in FIG. 4, in a third comparison step 126, if processor 64 detects that storage controller 34 has just rebooted (e.g., the storage controller has just recovered from a system crash), then in a retrieval step 128, the processor retrieves the mappings from mapping table 84, and stores the retrieved mappings to mapping table 68. Mapping table 68 now stores the same mappings that were in mapping table 84 prior to the reboot.

In an identification step 130, processor 64 identifies physical storage regions 60 that are not mapped in mapping table (i.e., these are the physical storage regions available for mapping), and in an initialization step 132, the processor stores physical region numbers for the identified physical storage regions to stable list 72, and the method continues with step 120. Upon completing the reboot, processor 64 initializes recent list 70 as an empty list (i.e., not populated with any physical region numbers).

Returning to step 126, if processor 64 did not detect a reboot, then the method continues with step 120. Returning to step 122, if recent list 70 is not populated, then the method also continues with step 120. Returning to step 120, if processor 64 did not detect that mapping table 68 was destaged, then the method continues with step 126.

Figure 5:
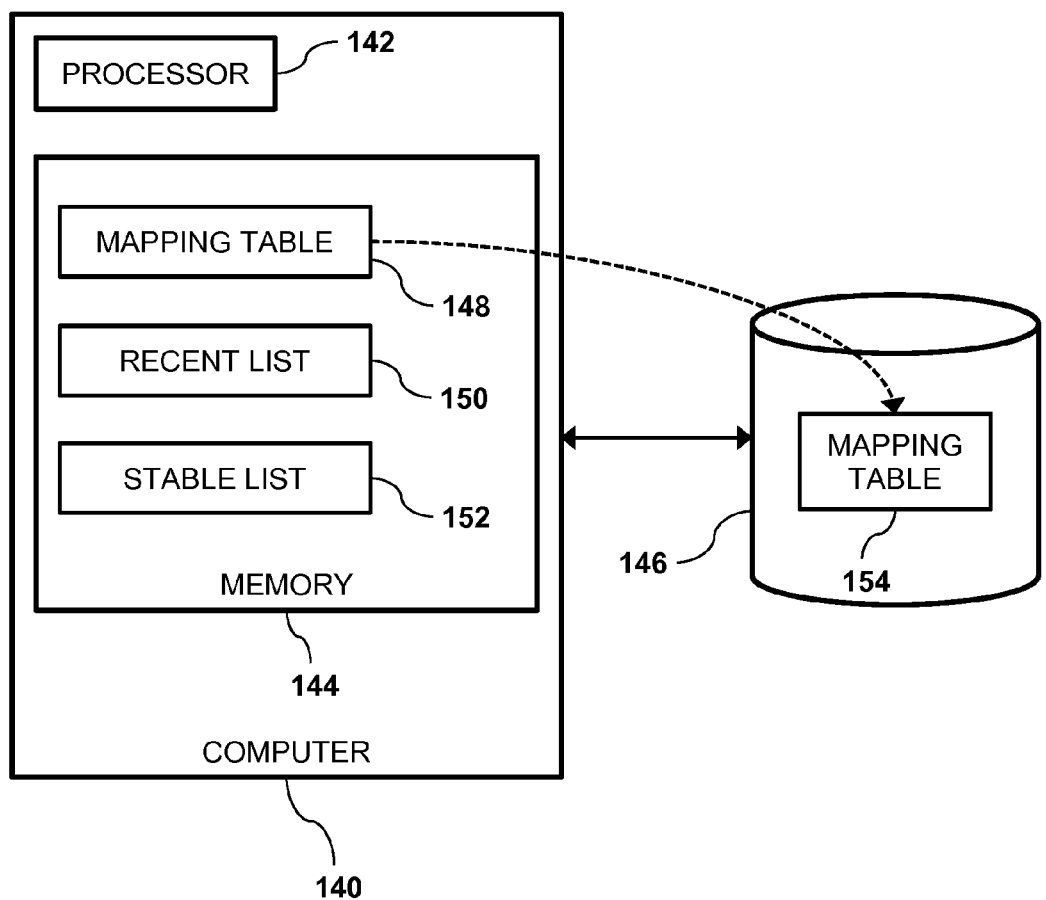
FIG. 5 is a block diagram that schematically illustrates a computer configured to manage physical storage region metadata, in accordance with an alternative embodiment of the present invention.

FIG. 5 is a block diagram that schematically illustrates a computer 140 configured to manage physical storage region metadata, in accordance with an alternative embodiment of the present invention. Elements of computer 140 can be used to implement embodiments of the present invention as described in FIGS. 3 and 4 hereinabove.

Computer 60 comprises a processor 142, a memory 144, and a storage device 146. Memory 144 stores a non-persisted mapping table 148, a recent list 150, and a stable list 152. Storage device 146 stores a persisted mapping table 154. In operation, processor 142 manages recent list 150, stable list 152 and mapping tables 148 and 154 in a manner similar to the way processor 64 manages recent list 70, stable list 72 and mapping tables 68 and 84, as described supra.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   configuring, in a memory, a mapping table to store mapping data between logical and physical storage regions on one or more storage devices;
   receiving, by a processor, a request to delete, from the mapping table, a given mapping data comprising a given physical storage region;
   storing metadata indicating the given physical storage region to a recent list stored in the memory; and
   upon detecting that the mapping table was destaged from the memory to a given storage device, moving the metadata from the recent list to a stable list stored in the memory.

2. The method according to claim 1, and comprising receiving a mapping request, and upon detecting metadata in the stable list indicating a given physical storage region, conveying the metadata stored in the stable list responsively to the request.

3. The method according to claim 2, wherein the given physical storage region comprises a first physical storage region, and comprising upon failing to detect the metadata in the stable list and detecting metadata in the recent list indicating a second given physical storage region, conveying the metadata stored in the recent list responsively to the request.

4. The method according to claim 1, wherein the recent list comprises a first last-in-first-out (LIFO) queue and the stable list comprises a second LIFO queue.

5. The method according to claim 4, wherein the one or more storage devices comprise one or more hard disk drives.

6. The method according to claim 5, wherein moving the metadata comprises prepending the first LIFO queue to the second LIFO queue.

7. The method according to claim 1, and comprising upon recovering from a system failure, retrieving the destaged mapping table from the given storage device, identifying multiple physical storage regions of the one or more storage devices not mapped in the retrieved mapping table, and for each given identified physical storage region, adding, to the stable list, metadata indicating the given identified physical storage region.

8. An apparatus, comprising:
   a storage device comprising multiple physical storage regions;
   a memory configured to store a mapping table, a recent list, and a stable list; and
   a processor arranged:
      to configure the mapping table to store mapping data between logical storage regions and the physical storage regions;
      to receive a request to delete, from the mapping table, a given mapping data comprising a given physical storage region,
      to store metadata indicating the given physical storage region to the recent list, and
      upon detecting that the mapping table was destaged from the memory to the storage device, to move the metadata from the recent list to the stable list.

9. The apparatus according to claim 8, wherein the processor is configured to receive a mapping request, and upon detecting, metadata in the stable list indicating a given physical storage region, to convey the metadata stored in the stable list responsively to the request.

10. The apparatus according to claim 9, wherein the given physical storage region comprises a first physical storage region, and wherein upon failing to detect the metadata in the stable list and detecting, in the recent list, metadata indicating a second given physical storage region, the processor is configured to convey the metadata stored in the recent list responsively to the request.

11. The apparatus according to claim 8, wherein the recent list comprises a first last-in-first-out (LIFO) queue and the stable list comprises a second LIFO queue.

12. The apparatus according to claim 11, wherein the one or more storage devices comprise one or more hard disk drives.

13. The apparatus according to claim 12, wherein the processor is configured to move the metadata by prepending the first LIFO queue to the second LIFO queue.

14. The apparatus according to claim 8, wherein upon recovering from a system failure, the processor is configured to retrieve the destaged mapping table from the given storage device, to identify multiple physical storage regions of the one or more storage devices not mapped in the retrieved mapping table, and for each given identified physical storage region, to add, to the stable list, metadata indicating the given identified physical storage region.

15. A computer program product, the computer program product comprising:
   a non-transitory computer readable storage medium having computer readable program code embodied therewith, the computer readable program code comprising:
   computer readable program code arranged to configure, in a memory, a mapping table to store mapping data between logical and physical storage regions on one or more storage devices;
   computer readable program code configured to receive a request to delete, from the mapping table, a given mapping data comprising a given physical storage region;
   computer readable program code configured to store metadata indicating the given physical storage region to a recent list stored in the memory; and
   computer readable program code configured, upon detecting that the mapping table was destaged from the memory to a given storage device, to move the metadata from the recent list to a stable list stored in the memory.

16. The computer program product according to claim 15, and comprising computer readable program code configured to receive a mapping request, and upon detecting metadata in the stable list indicating a given physical storage region, to convey the metadata stored in the stable list responsively to the request.

17. The computer program product according to claim 16, wherein the given physical storage region comprises a first physical storage region, and comprising computer readable program code configured, upon failing to detect the metadata in the stable list and detecting metadata in the recent list indicating a second given physical storage region, to convey the metadata stored in the recent list responsively to the request.

18. The computer program product according to claim 15, wherein the recent list comprises a first last-in-first-out (LIFO) queue and the stable list comprises a second LIFO queue, and wherein the one or more storage devices comprise one or more hard disk drives.

19. The method according to claim 18, wherein computer readable program code is configured to move the metadata by prepending the first LIFO queue to the second LIFO queue.

20. The computer program product according to claim 15, and comprising upon recovering from a system failure, computer readable program code configured to retrieve the destaged mapping table from the given storage device, to identify multiple physical storage regions of the one or more storage devices not mapped in the retrieved mapping table, and for each given identified physical storage region, to add, to the stable list, metadata indicating the given identified physical storage region.

* * * * *